INVENTOR
FRANCIS H. STITES
BY Paul S. Martin
ATTORNEY

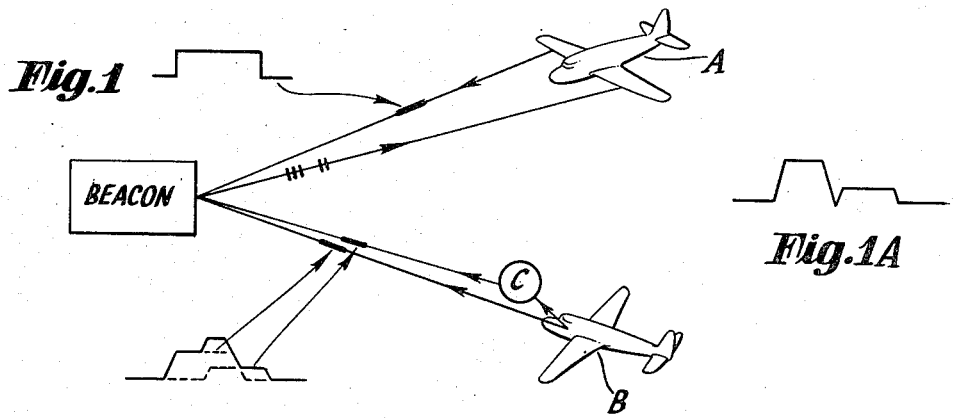
Fig.1
Fig.1A
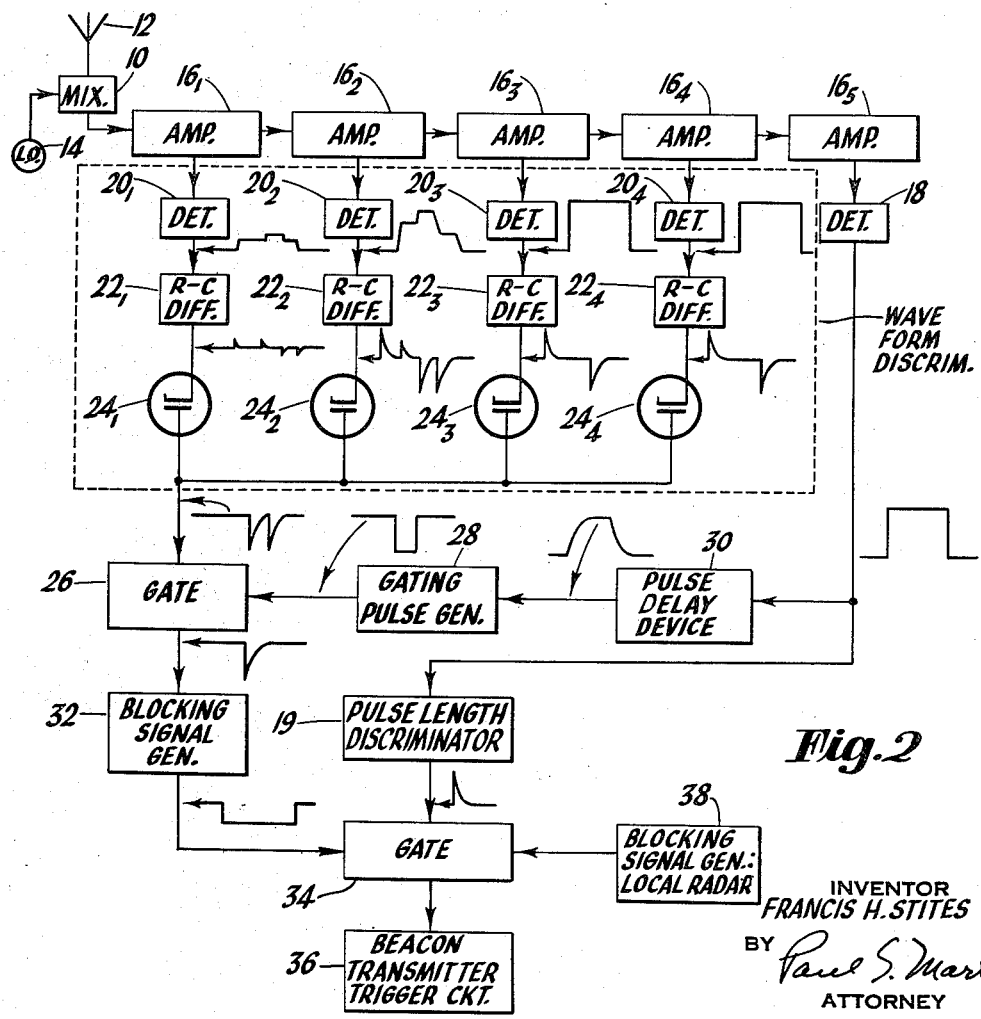
Fig.2
INVENTOR
FRANCIS H. STITES
BY
Paul S. Martin
ATTORNEY Jan. 8, 1957.  F. H. STITES  2,777,059
ECHO SUPPRESSION BEACONS
Filed April 13, 1951  4 Sheets-Sheet 2
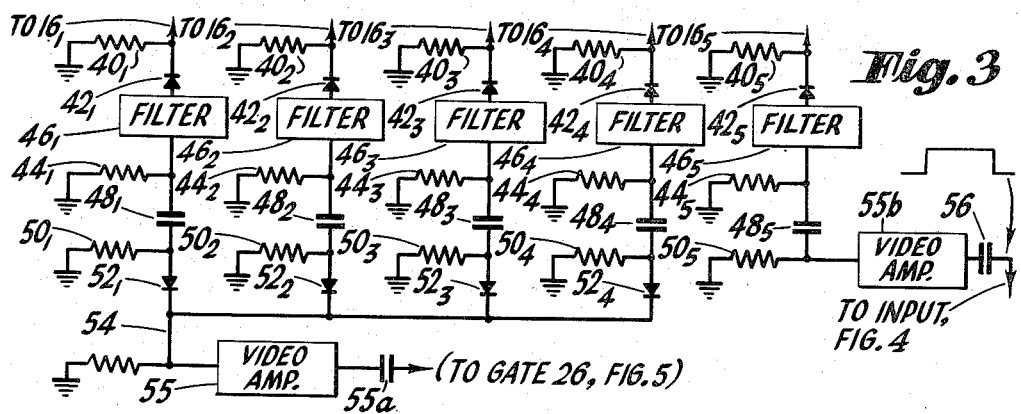
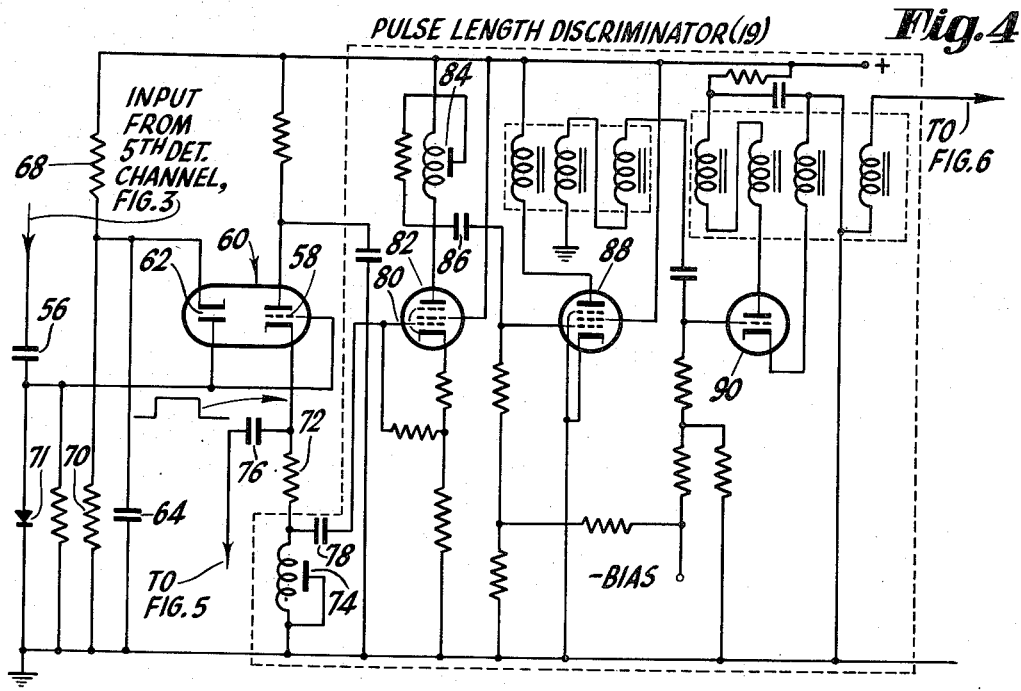
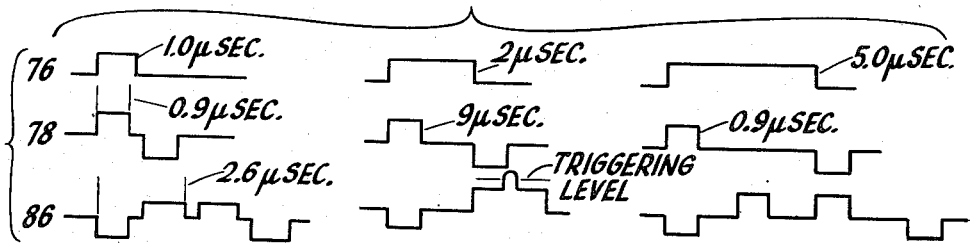
Fig.4A
INVENTOR
FRANCIS H. STITES
BY
Paul S. Martin
ATTORNEY Jan. 8, 1957.  F. H. STITES  2,777,059
ECHO SUPPRESSION BEACONS
Filed April 13, 1951  4 Sheets-Sheet 3

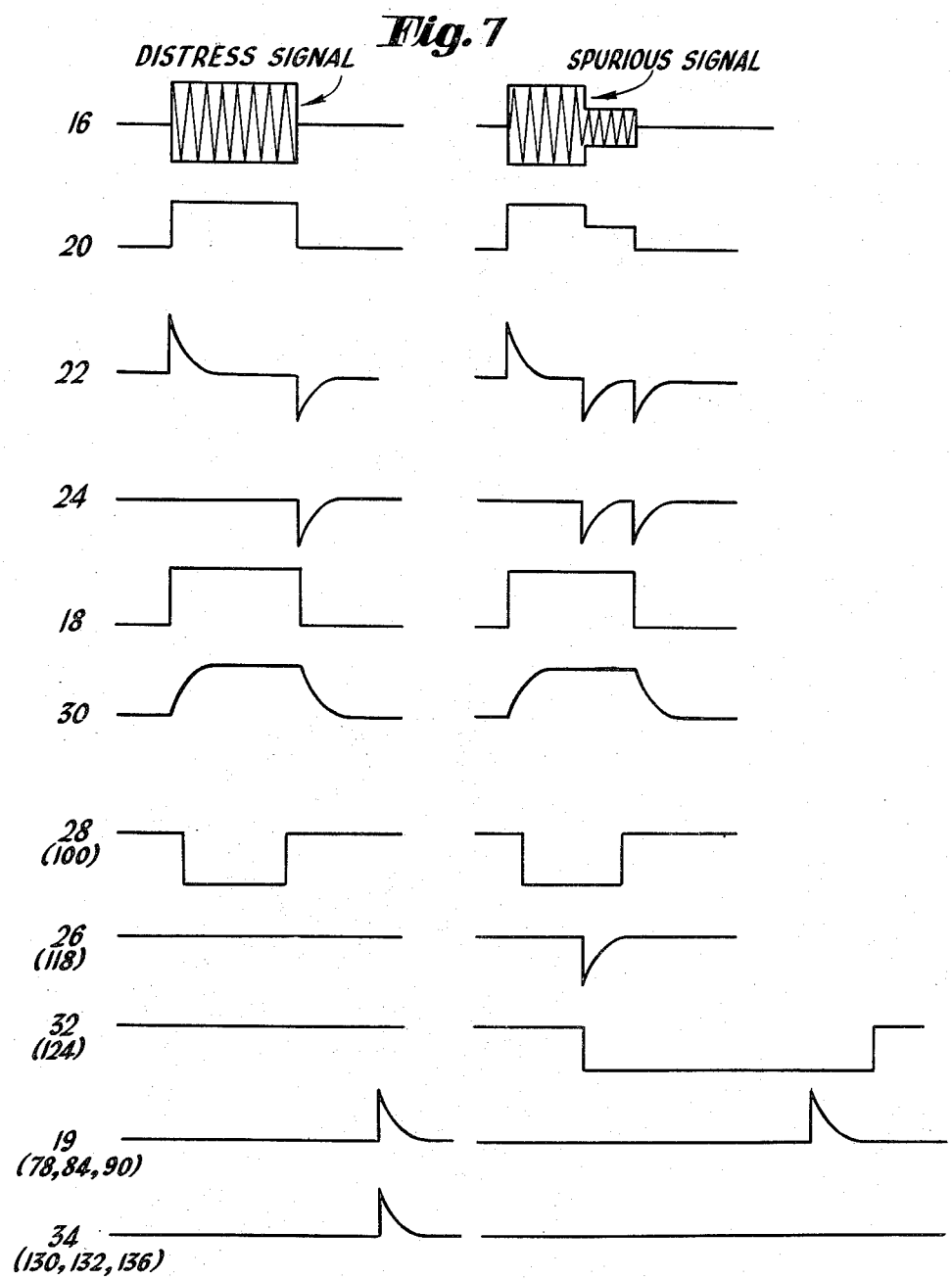

United States Patent Office 2,777,059
Patented Jan. 8, 1957

2,777,059
ECHO SUPPRESSION BEACONS

Francis H. Stites, Wayland, Mass., assignor to Sylvania Electric Products Inc., a corporation of Massachusetts Application April 13, 1951, Serial No. 220,916

4 Claims. (Cl. 250—27)

The present invention relates to radio navigation systems, and, in particular, to beacons used in radio navigation in conjunction with radar units.

Beacons have been used at various geographical locations for transmitting coded pulses which identify the respective locations of those beacons. It is considered undesirable that the beacon should operate continuously, not only because of the waste entailed, but also because of the disturbing effect of the beacon signals on radar screens in the area. This will be understood from the manner of operation of radar beacons.

The radar beacon is used to send a coded signal at a frequency corresponding to that of a mobile radar set so that the signal of the beacon will visually appear on the cathode-ray screen of the mobile radar. The direction and range of the beacon are represented on the radar screen in a manner very similar to the representation of an object-reflection signal on the radar screen, that is to say, on the so-called PPI screen for example there will appear a code signal at an angular position representing the direction of the beacon from the mobile radar unit and the radial position of the beacon code signal will indicate approximate distance between the beacon and the radar unit. If the beacon were operating continuously and all other beacons similarly transmitted signals to all radar units within their range, there would appear on all radar screens a large amount of unwanted beacon signal representations interfering with the normal geographic or other radar pattern. To avoid continuous beacon operation, beacons have been designed to respond only to a pulse of a length different from that normally employed by radar units. In normal operation, the radar unit would transmit pulses of one micro-second duration, for example, but such radar units could be switched to 2 micro-second pulse operation for triggering beacons in the area. Should a "lost" aircraft switch to 2 micro-second radar pulses, there would appear on its radar screen a series of differently positioned beacon signals, coded to identify their respective locations. By means, the aircraft is enabled to ascertain its position, and then resume normal 1 micro-second radar pulse transmission.

Beacons, as a practical matter, are designed to operate over a very broad latitude of received signal strengths. A distant "lost" aircraft should be able to trigger the beacon and a close "lost" aircraft should also be able to trigger the beacon. With these requirements the high-gain beacon receiver tends to become over-loaded for strong signals and the pulses received tend to be self-limiting.

It is possible for two signals of 1 micro-second each to be received in rapid sequence or in overlapping relation and, when this occurs, the self-limiting beacon receiver tends to produce response just as if the 2 micro-second pulse were received. Such condition is encountered through random combinations of short pulses, and through combinations of normal radar pulses with echoes of those normal radar pulses. This occurs when the aircraft radar and the reflecting object are near each other, and when the reflecting object is close to the beacon. The combined 1 micro-second and its echo simulate a 2 micro-second "distress" signal in the beacon receiver.

One of the purposes of the present invention accordingly, is to adapt beacon receivers to distinguish between triggering signals of a particular duration and combined signals of shorter duration which in combination simulate triggering signals.

The spurious signal which usually consists of a radar pulse and its echo typically includes a strong first half and a substantially weaker second half. Because this spurious signal is in most instances due to echo signals, the present invention has been entitled "Echo Suppression Beacons" but, because of more general effectiveness, this title is not used in any limiting sense.

The beacon receiver conventionally includes a pulse length discriminator which causes triggering of the beacon transmitter in response to received signals of a particular length or duration. Spurious signals simulate proper signals at the output of the pulse amplifier because of the self-limiting characteristic of that amplifier. In the high-gain amplifier, the distinctive wave-form of spurious signals is obliterated. A further object of the invention accordingly, is to enable beacon receivers to distinguish spurious signals from true beacon triggering signals. More specifically, an object of the invention is to provide a beacon receiver with joint control by a pulse length discriminator and a system distinguishing among different pulse wave-forms. In one aspect, therefore, the invention provides a beacon receiver for controlling a beacon transmitter, the receiver containing a transmitter control circuit whose operation depends not only upon a pulse length discriminator but also upon a wave form discriminator. In the illustrative embodiment, this is achieved by employing a plurality of detectors at various points in the cascade of amplifying stages, so that at least one of these detectors will receive a signal of adequate strength and that signal will, nevertheless, retain its original wave-form before limiting. These detected signals are combined in such a manner that any departure from the flat topped proper beacon-triggering signal is accentuated and this departure is utilized to suppress triggering of the beacon transmitter by a spurious pulse of the same duration as a "distress" pulse, yet insure beacon operation in response to a true "distress" signal. These detectors all produce flat topped output signals in response to true beacon triggering signals and do not interfere with response of the beacon to such signals.

The nature of the invention in the foregoing aspects will be better understood from the following detailed description of an illustrative embodiment, considered in connection with the accompanying drawings; and from this description, further aspects of the invention and features of novelty will become apparent. In the accompanying drawings:

Figure 1 is a diagram illustrating ordinary beacon operation and the production of spurious beacon-triggering pulses, and Figure 1A illustrates an alternative form of spurious pulse;

Figure 2 is the block diagram of a beacon receiver embodying features of the present invention;

Figure 3 is a wiring diagram, partly a block diagram form, of a portion of the receiver in Figure 2;

Figure 4 is the wiring diagram of another portion of the receiver in Figure 2, including the pulse length discriminator, and Figure 4A is a time diagram of pulses at various points in the pulse length discriminator of Figure 4;

Figure 7 is a diagram of pulse wave-forms at different parts of the system of Figure 2.

Figure 5:
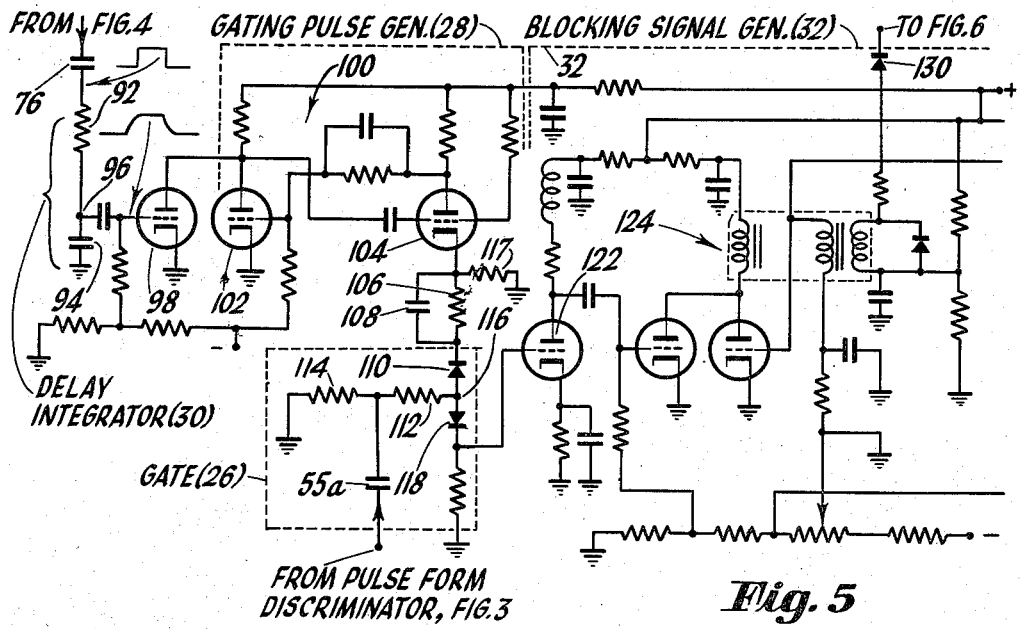
Figures 5 and 6 are wiring diagrams of additional portions of Figure 2.

Referring now to the drawings, Figure 1 shows a beacon sending a code pulse after being triggered in response to "distress" signal (represented by the rectangular pulse form) from aircraft "A." Aircraft "B," whose radar is operating normally, transmits a short pulse that combines with an echo signal from object "C" which pulse and echo combine typically to produce a complex wave-form such as that illustrated. The pulse and echo are presumed here to overlap and produce a wave-form that is, of necessity, not flat-topped. Another wave-form is shown in Figure 1A which is produced when a short radar pulse and its echo are closely spaced but not in overlapping relation. Both of the wave-forms illustrated would appear substantially like that from aircraft "A," after limiting in the beacon receiver; so that the beacon transmitter would be triggered. By addition of a wave-form discriminator to the usual beacon receiver and by integrating it into this combination, the beacon receiver is enabled to distinguish between pulses whose amplitudes vary, and flat-topped pulses where both are of the same or nearly the same duration.

In Figure 2 there is shown a block diagram of the beacon from which the beacon transmitter has been omitted, that is to say, Figure 2 includes the beacon receiver and the control circuit for triggering the transmitter.

The conventional beacon receiver includes mixer 10 for heterodyning signals from omni-directional antenna 12 with signals from local oscillator 14 to produce an intermediate frequency signal that is amplified in cascaded ampliers $16_1$, $16_2$ . . . $16_5$. These amplifier stages in aggregate deliver signals to detector 18 to energize pulse length discriminator 19 for triggering the beacon transmitter in response to a received pulse of proper duration.

In addition to this, there has been provided a system for deriving an adequately amplified signal, but, nonetheless unlimited signal, for control of the transmitter triggering device conjointly with the pulse length discriminator. In Figure 2, a number of detectors $20_1$, $20_2$, $20_3$, and $20_4$ are shown connected to corresponding amplifier stages $16_1$, $16_2$, $16_3$, and $16_4$. These produce the wave forms illustrated in response to the spurious signal of Figure 1. It is assumed that the spurious signal is of inadequate strength at the output of amplifier stage $16_1$ to have any effect and that the gain of the amplifier is such that this signal is limited so as to be flat topped at the output sides of amplifier stages $16_3$, $16_4$ and $16_5$. The amplifier may, for example, be made up of a series of ten stages, each of which is a distributed amplifier and the cascade of stages is designed to produce a gain sufficient for operation in response to signals whose strength may vary at the beacon antenna from $1 \times 10^{-10}$ watts to $5 \times 10^{-2}$ watts. In the block diagram in Figure 2, the wave forms indicate a signal of intermediate strength that is properly amplified at the output of stage $16_2$ so as to produce the true, unlimited wave form of useful amplitude at the output of detector $20_2$.

The output signals of detectors 20 are differentiated in units $22_1$, $22_2$, $22_3$, and $22_4$ and the output signals of these differentiators are also illustrated in this block diagram by the coordinated wave-form representations. These differentiating signals are collected through diodes $24_1$, $24_2$, $24_3$ and $24_4$ which, in this instance, are polarized to pass the negative portions of the differentiated output and to combine them for application (with suitable amplification) in the following control circuit.

The control circuit includes a gate 26 whose output depends jointly on the combined input from collector diodes 24 and from the gating pulse generator 28 which, in turn, is energized by detector 18 through pulse delay device 30, advantageously an integrator that prevents operation of pulse generator 28 and of gate 26 in response to noise impulses of brief duration but insures slightly retarded operation of the gating pulse generator in response to both spurious and proper radar pulses received by the beacon.

Switch 26 is rendered effective by pulse generator 28 to trigger a blocking signal generator 32 in the event that during the time interval of a proper pulse, there should be an output from the collectors demonstrating improper wave-form of the pulse and, hence, showing the received pulse to be spurious. Generator 32 produces no signal except in response to collectors 24 and pulse generator 28. A gate or switch 34 is provided for triggering the transmitter control unit 36 in response to output from pulse length discriminator 19 indicating a pulse of proper duration; but transmission through switch 34 is suppressed by a signal from blocking signal generator 32 in response to a received pulse of proper length but of spurious wave form. Switch 34 can also be arranged to suppress transmission from the pulse length discriminator to avoid triggering the transmitter in response to a particularly powerful radar unit in the immediate vicinity. Such powerful local short pulse might overload the amplifier at its very input and produce a flat-topped wave at the output of detector $20_1$. This is effected by the blocking signal generator 38 that is energized as by direct connection to a local radar unit. It is apparent, then, that pulse length discriminator 19 transmits an activating pulse to beacon transmitter triggering circuit 36 unless gate 34 blocks this transmission because of a blocking signal produced under control of the wave-form discriminator, or under control of the local radar. In this way, operation of the beacon is produced in response to flat-topped pulses of a certain duration, but is avoided for varied-amplitude pulses of the same duration.

Pulse form discriminator

The pulse sampling detectors represented in the block diagram in Figure 2 may advantageously take the form shown in Figure 3. In this figure, the detectors are seen to include resistors $40_1$, $40_2$, $40_3$, and $40_4$ across which the signal, amplified to various levels by respective cascade amplifier stages, is impressed. Additionally, detector 18 is illustrated, having an input signal applied to resistor $40_5$. Series diodes $42_1$, $42_2$, $42_3$, $42_4$ and $42_5$ transmit the demodulated pulse to load resistors $44_1$, $44_2$, $44_3$, $44_4$, and $44_5$ through filters $46_1$, $46_2$, $46_3$, $46_4$, and $46_5$ whose effect is to prevent transmission or feedback of the carrier frequency energy.

The detected and filtered pulses as sampled from the various amplifier stages are differentiated by capacitors $48_1$, $48_2$, $48_3$, and $48_4$ and resistors $50_1$, $50_2$, $50_3$ and $50_4$. These differentiators produce positive-going surge for each pulse increment and a negative-going surge for each pulse decrement. A series of diodes $52_1$, $52_2$, $52_3$, and $52_4$, connected to the differentiators, are polarized to pass only the negative surges of the differentiators. These diodes are connected in common to output line 54 and to gate 26 in Figure 2 (see also Figure 5) through a suitable broad-band (video) amplifier 55 and output coupling condenser 55a. The effect of diodes 52 is to pass the proper pulses for gate 26 (Figure 2) but to prevent reverse signal transmission from each of the detector channels reversely into the others.

In operation, the multiple detector channels will deliver a negative pulse to switch or gate 26 at the end of each pulse, and a negative pulse for each drop in pulse amplitude; but only if a negative pulse occurs within 2 micro-seconds of the positive or starting portion of the received pulse will be detector channels have the control effect to be described. In aggregate, the detector channels, the differentiators in those detector channels, and the collector diodes or combining network, may be identified as a wave form discriminator because this combination produces no output during a flat-top long pulse of the character intended to trigger the beacon transmitter but, in the event of any interruption or other decrement of pulse strength during an equally long pulse, the wave-form discriminator delivers a control signal disabling the beacon transmitter triggering system, in a manner to be further detailed. And because the waveform discriminator contains plural channels coupled respectively to different signal levels in the cascaded amplifier, it is herein designated a multi-channel multi-level wave form discriminator.

Pulse length discriminator

At this point, it may be well to digress somewhat to describe the pulse length discriminator energized by the complete cascade of amplifiers. This portion of the beacon receiver circuit is largely of a known form, but here it is modified for suppressing response to noise, both for the pulse length discriminator and the pulse form discriminator.

This portion of the circuit is shown in Figure 4, receiving square-wave pulses together with noise from video amplifier 55b and detector 42₅ (Figure 3). The input signal is derived from the fifth detector channel (Figures 2 and 3) so as to be coupled through capacitors 56 to the grid 58 of a cathode follower stage 60. Between grid 58 and ground, there is a series circuit through diode 62 and capacitor 64, the junction of this diode and capacitor being connected at top 66 of biasing voltage divider 68, 70, the purpose of which is to render diode 62 non-conducting except when the signal reaches a value at which "clipping" or signal limiting is to be effected. As a result, the signal transmitted to grid 58 never exceeds a voltage that is accurately fixed by voltage divider 68, 70. This limiting is important because of the voltage sensitivity of the particular form of pulse length discriminator (to be described) that is used here. Diode 71 suppresses trailing reverse pulses at the ends of input signal pulses. These negative transients are due to limiting.

The output of cathode follower 60 is impressed across a cathode load resistor 72 in series with a so-called "tolerance" delay line 74 forming part of the pulse length discriminator. The limited pulse is also transmitted to the gate 26 (Figure 2) through coupling capacitor 76, via pulse delay device or integrator 30 and gating pulse generator 28 (Figure 2) to be further described in connection with Figure 5.

The pulses appearing at the cathode follower stage 60 are square waves of short or long duration, as is indicated in Figure 4. However, the voltage across delay line 74 is modified, the signal rising to the maximum after a brief delay, and, after a fixed time interval, drops to zero. A reverse pulse of the same duration is produced, commencing at the end of the input square wave as is indicated at 78 in Figure 4A. (Figure 4A shows the voltage wave forms developed in the pulse length discriminator in response to signals of 1 micro-second, 2 micro-seconds, and 5 micro-seconds duration as those signals appear at capacitor 76, 78, and 86.) This modified signal is transmitted through coupling capacitor 78 to the grid 80 of a biased amplifier 82, which amplifier has a further delay line 84 as its load, the function of this being to furnish a "basic delay" perhaps 1.2 microseconds in addition to that provided by the "tolerance" delay line. Because of this additional delay line, the output signal coupled through capacitor 86 is not a replica of the signal coupled through capacitor 78, but appears, instead, as indicated in Figure 4A. The signal at capacitor 86 is transmitted through amplifier 88 to a normally inoperative blocking oscillator 90 which is more or less conventional, but not free running by virtue of a negative bias on its grid. This bias is overcome in response to each triggering pulse (Figure 4A) to generate a control signal for trigger circuit 36 (Figure 2) (subject to control by the pulse form discriminator) in response to a pulse of predetermined length. The operation of this pulse length discriminator is described in greater detail in volume 3 of the Radiation Laboratory Series "Radar Beacons," page 186 (McGraw-Hill). The effect of the delay lines is such that the bias on the blocking oscillator is never exceeded except for pulses whose length is a minimum fixed by basic delay line 84, subject to a "tolerance" increase set by delay device 74. For pulses within this latitude, there is developed a brief sharp excess substantially above the bias level of the blocking oscillator, due to a combination of pulses developed in the delay lines, only in response to such excess is the blocking oscillator triggered to emit a single pulse.

Echo suppression control circuit

In Figure 5, there is shown a specific illustrative portion of the system represented in Figure 2 by units 26, 28, 30, and 32. The input to the circuit of Figure 5 is received from capacitor 76 (Figure 4) and is normally a square wave when the pulse is received, but, in the alternative, the input signal might be highly amplified noise. This signal is impressed upon an integrator including resistor 92 in series with capacitor 94, the arrangement being such as to prevent substantial buildup of voltage at the junction 96 of this integrator in response to noise but to insure adequate voltage in this junction in response to signal pulses. This pulse signal voltage is amplified by stage 98 and is impressed upon a mono-stable multivibrator 100 including triodes 102 and 104.

The latter is normally conducting. Its cathode circuit includes a self-bias resistor 106 and capacitor 108 in series with the crystal diode 110 and voltage dividing resistors 112 and 114. In the absence of a signal when triode 104 is conducting, diode 110 is also conducting and impresses a positive potential on junction 116 of diode 110 and resistor 112. Upon reception of a pulse (as distinguished from noise by integrator 92, 94) the mono-vibrator 100 is reversed so as to make triode 102 conducting for a fixed time interval of perhaps 1.5 microseconds and cut off the current through the triode 104. During this time, the voltage at junction 116 is approximately at ground potential, as insured by resistor 117.

Diode 118 is connected to diode 110 but is polarized oppositely. This opposite polarization renders diode 118 non-conducting except when the mono-stable multivibrator 100 has been triggered by a pulse, and diode 118 then remains conducting for only the time fixed by the multi-vibrator, 1.5 microseconds in this illustration.

Negative signals in the form of pulses are delivered through a suitable amplifier 55 from the wave-form discriminator (Figure 3) through capacitor 55a (Figure 5) and resistor 112 to diode 118. Negative pulses resulting from noise are blocked by diode 118 because at this stage diode 110 is conducting and diode 118 is non-conducting; but negative pulses from the waveform discriminator are permitted to pass diode 118 while triode 104 is non-conducting as is the case when a pulse (as distinguished from noise) has been received. Incidentally, pulses received at diode 118 during the brief time of integration of integrator 92, 94, are suppressed.

Assuming that a pulse has been received which is of the type intended to trigger the beacon transmitter, no signal is received via capacitor 55a and, hence, no signal passes through diode 118 even though this diode is conducting during the received pulse. If a pulse of short duration is received, operation of the beacon transmitter will not result because of the control effect of the pulse length discriminator and, hence, even though a negative pulse may pass through capacitor 55a and diode 118, such action of the wave-form discriminator and its output control circuit is of little importance. However, in the event that a pulse of proper duration is received, but is of varying amplitude (such as that resulting from a brief radar pulse with a trailing echo of that pulse) the wave-form discriminator produces a negative pulse while diode 118 is conducting and the following control is effected.

The negative pulse transmitted by diode 118 is amplified and inverted by stage 122 and impressed as a positive triggering voltage on the blocking oscillator 124 which is normally blocked by negative bias. In response to the negative pulse through diode 118, blocking oscillator 124 generates a control pulse of long duration that is transmitted to a control circuit (Figure 6) to be described. This control is, by design, made longer than that of the pulse length discriminator so that the effect of the pulse form discriminator will, with assurance, suppress operation of the beacon transmitter despite any tendency of the pulse length discriminator to trigger the transmitter.

PLD and PFD gating circuit

Figure 6:
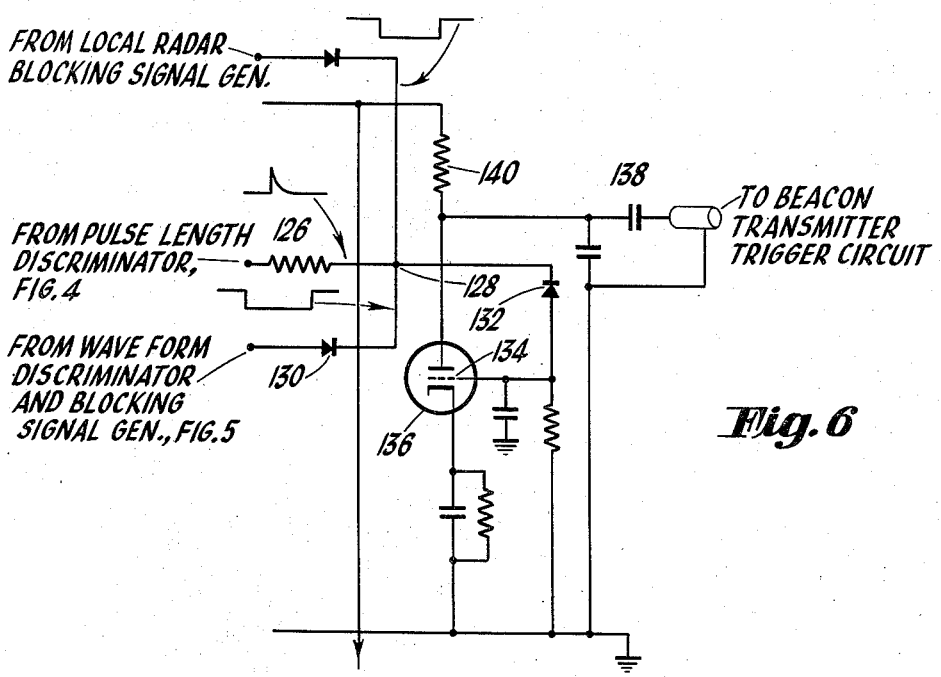

In Figure 6 there is shown a circuit whose purpose is to suppress operation of the beacon transmitter despite favorable length of pulse as determined by the pulse length discriminator, in the event that a spurious form of pulse is received rather than a flat-topped beacon triggering pulse. The circuit of Figure 6 essentially is a gate for transmitting triggering pulses from the pulse length discriminator (Figure 4) to the beacon transmitter control circuit, but for disabling such transmission when a pulse is also delivered under control of the wave-form discriminator (Figures 3 and 5). A brief positive-pulse output from the pulse length discriminator as produced by a blocking oscillator (Figure 4) is applied through isolating resistor 126 to junction 128 of the gating circuit. A negative output pulse is transmitted from the blocking oscillator 124, that is triggered under proper conditions by the wave-form discriminator, through diode 130 and this pulse is of sufficient duration and voltage amplitude to outlast and over-ride any pulse from the pulse length discriminator. Diode 132 is interposed between junction 128 and grid 134 of an amplifier 136. Diode 132 passes positive pulses only, such pulses coming via isolation resistor 126. Diode 132 presents high impedance to the negative blocking pulses from diode 130 so that this negative voltage is effective at junction 128. The lower-voltage positive pulses from resistor 126 are consequently ineffective.

Amplified output from the pulse length discriminator appears at terminal 138 by virtue of load resistor 140 except when suppressed by a blocking signal.

It may happen that a very powerful normal radar signal of brief duration is received, immediately followed by its echo, the aggregate of which pulses are sufficiently intense to produce severe overloading of the beacon receiver and disturbance in the beacon receiver power supply. Such pulse may be expected from a radar set at the same location as the beacon. A signal can be derived from such radar set with a suitable pulse generator and applied to junction 128 as indicated for suppressing operation of the beacon transmitter despite the fact that the wave-form discriminator is disabled by the severe overload.

Operation

A review of the entire operation of the system may be appropriate and will be understood from the foregoing description in connection with Figures 3 to 6 inclusive but with special attention to Figure 2. The phase diagram appears in Figure 7 which identifies two forms of signal at various output points in Figure 2.

A signal as received appears in amplifier stage 16₁ as represented in Figure 7 and may be either a beacon triggering pulse or it may be a spurious signal such as might be caused by a normal (short) radar signal with a trailing echo. When amplified and inherently limited, the output of detector 18 appears as a square wave, both when a good pulse and when a spurious pulse is received. However, one of the detectors $20_1$, $20_2$, $20_3$, or $20_4$ produces a flat-topped wave for a good pulse and a suitably strong stepped wave for a spurious pulse. The output of the particular detector 20 that may be effective produces one positive surge and one negative surge at the output of its differentiator 22 in response to a good pulse, but one positive pulse followed by plural negative pulses are produced in response to spurious forms of pulses. Whether the normal radar pulse and its echo follow in quick succession so as to leave a time interval between them while still simulating a good pulse after limiting, or whether these normal and echo pulses overlap, there will always appear a negative pulse in the output of a differentiator 22 before the end of a 2 microsecond interval. This negative pulse is one in addition to the usual negative pulse at the end of a true beacon-triggering signal. The extra, early negative pulse is transmitted by a collector diode 24.

Delay device or integrator 30 modifies the square waves provided by detector 18 in response to both good and spurious pulses into a delayed and modified square wave as indicated. Integrator 30 controls the gating pulse generator 28 (multi-vibrator 100) that is of perhaps 1.5 micro-seconds duration because of the delay introduced by integrator 30 and the tolerance desired at the end of the square wave pulse to suppress the normal negative pulse. It is of course undesirable for the negative pulse produced by the end of a proper square wave pulse and transmitted by the wave-form discriminator to be transmitted through gate 26 (Figure 2) and diode 118 (Figure 5) for triggering the blocking oscillator 124. Such action might suppress proper operation of the beacon transmitter. However, it is desirable for gating pulse generator 28 to condition gate 26 (diode 118) to transmit a negative pulse at a time earlier than the trailing end of a received 2 micro-second pulse. The transmission of a negative pulse by gate 26 triggers gating pulse generator 32 (blocking oscillator 124 in Figure 5) and while pulse length discriminator 19 controls blocking oscillator 90 to produce a beacon triggering pulse for both good and spurious pulses, the gate 34 (130, 132, 136) transmits a beacon triggering signal only in response to a good pulse as received. Response to a spurious pulse of the same duration such as may be synthesized by a shorter signal and its echo is suppressed.

What is claimed is:

1. A beacon responsive to a long pulse and having means for suppressing response to combinations of shorter pulses, including a cascade of amplifier stages having ample gain for limiting signals over a wide range of input signal lengths, a pulse length discriminator energized by the cascade of stages, a multiple channel wave-form discriminator the channels of which are respectively coupled to different stages of the cascade amplifier, said channels including means responsive to deviations from constant-amplitude pulses, a combining network energized by said deviation responsive means, and means jointly energized by the combining network and the pulse length discriminator for enabling beacon response to pulses of proper length whose level is substantially constant.

2. The combination of an input circuit, a pulse length discriminator and a wave-form discriminator coupled in parallel both energized by said input circuit and connected in control relation to a utilization circuit operable only on favorable evaluation of wave-form and pulse length, and an integrator energized by said input circuit and connected in control relation to the control connection of the wave-form discriminator to suppress the effects of the wave-form discriminator in response to brief noise pulses.

3. A beacon responsive to a long pulse and having means for suppressing response to combinations of shorter pulses, including in combination a pulse length discriminator, a cascade of amplifier stages, a wave-form discriminator including multiple wave-form sampling channels connected separately to said amplifier stages, a combining network connected to said channels, and a control circuit rendered effective by said pulse length discriminator only in response to pulses of proper waveform and under control of the output of said combining network.

4. A beacon selectively responsive to a long pulse of predetermined duration and having means for suppressing response to combinations of shorter pulses, including in combination a pulse length discriminator, a wave-form discriminator having means effective to detect departures from a flat-top wave, a cascade of amplifier stages for energising said wave-form discriminator, said wave-form discriminator including multiple wave-form sampling channels connected separately to said amplifier stages, and a combining network connected to said channels, an output control circuit rendered effective by said pulse length discriminator only in response to pulses of proper waveform and under control of said wave-form discriminator, and a gating circuit having delayed input coupling to said cascade of amplifier stages so as to be insensitive to brief noise pulses, said gating circuit having control connection to said output control circuit for enabling the wave form discriminator to disable said control circuit in the event of detection of departures from a flat-top wave.

References Cited in the file of this patent

UNITED STATES PATENTS

| | | |
|---|---|---|
| 2,261,643 | Brown | Nov. 4, 1941 |
| 2,489,297 | Labin et al. | Nov. 29, 1949 |
| 2,515,178 | Barchok | July 18, 1950 |
| 2,515,187 | Bliss | July 18, 1950 |
| 2,527,474 | Alvarez | Oct. 24, 1950 |
| 2,531,393 | Burnight et al. | Nov. 28, 1950 |
| 2,534,746 | Wells | Dec. 19, 1950 |
| 2,568,750 | Krause et al. | Sept. 25, 1951 |
| 2,577,506 | Belleville | Dec. 4, 1951 |
| 2,677,763 | Sunstein | May 4, 1954 |